Patented Feb. 4, 1941

2,230,641

UNITED STATES PATENT OFFICE 2,230,641

ION EXCHANGE PROCESS

Donald M. Findlay, Passaic, N. J., assignor, by mesne assignments, to United States Rubber Company, New York, N. Y., a corporation of New Jersey No Drawing. Application June 9, 1938, Serial No. 212,690

10 Claims. (Cl. 210—24)

This invention relates to organic resins, and more particularly to organic resins suitable for use in ion-exchange processes, and methods of effectuating ion-exchanges with said resins.

According to the invention a phenol sulphonic acid is condensed, preferably in aqueous medium, with an aliphatic aldehyde having the formula $C_nH_{2n}O$ where $n$ is 1 or 2. The aldehyde, formaldehyde, or acetaldehyde, may be used in unpolymerized or polymerized form or in the form of compounds, such as hexamethylene tetramine, which liberate aldehyde in the presence of acid. Mixtures thereof may also be used.

Examples of phenol sulphonic acids that may be used are o-phenol sulphonic acid, m-phenol sulphonic acid, p-phenol sulphonic acid, m-cresol sulphonic acid, sulphonated cresylic acid, etc. Cresylic acid is known to be a mixture of o-, m-, and p-, cresols.

The phenol sulphonic acids may conveniently be incorporated in the reaction mixture in the form of their alkali metal salts, to which is added, for each molar proportion thereof, from 1 to 2 molar proportions of the aldehyde, together with a sufficient amount of another acid to set free the phenol sulphonic acid for the reaction, e. g. hydrochloric, sulphuric, acetic (glacial) etc.

The following example is illustrative of the invention, using a preferred formula and process:

|                                           | Grams |
|-------------------------------------------|-------|
| Sodium para-phenol sulphonate             | 100   |
| Water                                     | 90    |
| Hydrochloric acid concentrated (36%)      | 30    |
| Formalin solution (37% formaldehyde)      | 50    |

The water, acid and sodium phenol sulphonate are mixed and heated to 85° C. The formalin solution is then added and the temperature is held at 85° C. until the product has set to a gel. The gel is then broken up and dried in a current of dry air.

Increasing the proportion of formaldehyde results in denser resins, which swell less in aqueous media.

The above insoluble resin when dried as described, and ground to a fineness such that it would pass through a U. S. Standard sieve No. 10 but be retained by a U. S. Standard sieve No. 40, showed a high cation exchange capacity, i. e. possessed the property of exchanging hydrogen ions for metal or metalloid ions. 45 grams of the granular resin, when completely saturated with water, occupied a gross volume of 100 cc., and was capable of absorbing 1.8 g. of sodium ion from a 0.1 N solution of sodium chloride, exchanging therefor an equivalent amount of hydrogen ion. The resin absorbed 3.6 g. of sodium ion from a 0.1 N solution of sodium hydroxide, thus showing a considerably increased capacity in alkaline solution. The effluent from a bed containing the granular resin was free from all traces of coloring matter, after a few cycles of operation had removed a little coloring matter originally present. The resin is stable, maintaining its exchange capacity throughout a great number of absorption and regeneration cycles. In appearance it is a brittle material having a conchoidal fracture and its color may vary from purple-red to dark brown. When dry it is sufficiently brittle to be readily ground or pulverized to any desired degree of fineness.

The resin further, when saturated with sodium or a similar monovalent alkali metal ion, or hydrogen ion, will exchange the monovalent ion for divalent or trivalent metal ions, such as calcium, barium, iron, etc. Also, polyvalent ions absorbed by the resin can be exchanged for monovalent or polyvalent ions from solution, according to methods well known for other ion-active resins. The absorptive capacity is in all cases higher in alkaline solutions than in neutral or acid solutions.

As indicated above, in preparing the resin the phenol sulphonic acid may be added to the reaction mixture as such, or formed in situ from a salt of the sulfonic acid and an added acid. Another way it may be formed for the reaction is by starting with and mixing proper proportions of the phenol and either concentrated sulphuric acid, oleum, or chlorosulphonic acid. After the reaction has proceeded to give the phenol sulphonic acid, a formaldehyde solution or paraformaldehyde may be added and the resinification carried to completion as above.

The ion exchange resins may be used in all manners known at present involving ion-exchange reactions, among them being the purification of water and organic and inorganic solutions of chemicals; also the purification of gases; also for the preparation of inorganic salts, bases or acids where the cation-exchange capacity of the present resins may be found suitable.

Having thus described my invention, what I claim and desire to protect by Letters Patent is:

1. The process of treating fluids to effect the removal therefrom of particular constituents by absorption which comprises subjecting the fluid to the action of a water-insoluble resin prepared by reaction of from 1 to 2 molar proportions of formaldehyde with 1 molar proportion of a monohydric-phenol sulphonic acid in the absence of a polyhydric phenol.

2. The process of treating fluids to effect the removal therefrom of particular constituents by absorption which comprises subjecting the fluid to the action of a water-insoluble resin prepared by the condensation, in the presence of water, of one molecular proportion of a monohydric-phenol sulphonic acid with from one to two molecular proportions of an aliphatic aldehyde having the empirical formula $C_nH_{2n}O$ where $n$ is 1 or 2 in the absence of a polyhydric phenol.

3. The process of treating fluids to effect the removal therefrom of particular constituents by absorption which comprises subjecting the fluid to the action of a water-insoluble resin prepared by the condensation, in the presence of water, of one molecular proportion of a monohydric-phenol sulphonic acid with from one to two molecular proportions of a formaldehyde in the absence of a polyhydric phenol.

4. The process of treating fluids to effect the removal therefrom of particular constituents by absorption which comprises subjecting the fluid to the action of a water-insoluble resin prepared by the condensation, in the presence of water, of one molecular proportion of a monohydric-phenol sulphonic acid with from one to two molecular proportions of acetaldehyde in the absence of a polyhydric phenol.

5. The process of treating fluids to effect the removal therefrom of particular constituents by absorption which comprises subjecting the fluid to the action of a water-insoluble resin prepared by the condensation, in the presence of water, of one molecular proportion of p-phenol sulphonic acid with from one to two molecular proportions of formaldehyde in the absence of polyhydric phenol.

6. The process of treating fluids to effect the removal therefrom of particular constituents by absorption which comprises subjecting the fluid to the action of a water-insoluble resin prepared by the condensation, in the presence of water, of one molecular proportion of m-cresol sulphonic acid with from one to two molecular proportions of formaldehyde in the absence of a polyhydric phenol.

7. The process of treating fluids to effect the removal therefrom of particular constituents by absorption which comprises subjecting the fluid to the action of a water-insoluble resin prepared by the condensation, in the presence of water, of one molecular proportion of sulphonated cresylic acid with from one to two molecular proportions of formaldehyde in the absence of a polyhydric phenol.

8. The process of treating fluids to effect the removal therefrom of particular ions by a cation-exchange which comprises subjecting the fluid to the action of a water-insoluble synthetic resin prepared by reaction of from 1 to 2 molar proportions of an aliphatic aldehyde with 1 molar proportion of a monohydric-phenol sulphonic acid in the absence of a polyhydric phenol.

9. The process of treating liquids to effect the removal therefrom of particular ions by a cation-exchange which comprises subjecting the liquid to the action of a water-insoluble synthetic resin prepared by reaction of from 1 to 2 molar proportions of an aliphatic aldehyde with 1 molar proportion of a monohydric-phenol sulphonic acid in the absence of a polyhydric phenol.

10. The process of treating fluids to effect the removal therefrom of particular ions by a cation-exchange which comprises subjecting the fluid to the action of a water-insoluble synthetic resin prepared by reaction of from 1 to 2 molar proportions of an aliphatic aldehyde with 1 molar proportion of a monohydric-phenol sulphonic acid in the absence of a polyhydric phenol, said resin being brittle when dry and having a conchoidal fracture and varying in color from purple-red to dark brown.

DONALD M. FINDLAY.